(No Model.)

W. A. KERSCHNER.
LISTING CULTIVATOR.

No. 411,451. Patented Sept. 24, 1889.

Witnesses:

Inventor.
William A. Kerschner
per Hamilton Trevitt
Attorneys.

UNITED STATES PATENT OFFICE.

WILLIAM AARON KERSCHNER, OF LINCOLN, NEBRASKA.

LISTING-CULTIVATOR.

SPECIFICATION forming part of Letters Patent No. 411,451, dated September 24, 1889.

Application filed February 15, 1889. Serial No. 299,969. (No model.)

*To all whom it may concern:*

Be it known that I, WILLIAM AARON KERSCHNER, a citizen of the United States, residing at Lincoln, in the county of Lancaster and State of Nebraska, have invented certain new and useful Improvements in Listing-Cultivators; and I do hereby declare the following to be a full, clear, and exact description of the invention, such as will enable others skilled in the art to which it appertains to make and use the same.

My invention is an improved cultivator for listed corn; and it consists in certain novel and peculiar features of construction hereinafter fully described and claimed.

Figure 1:
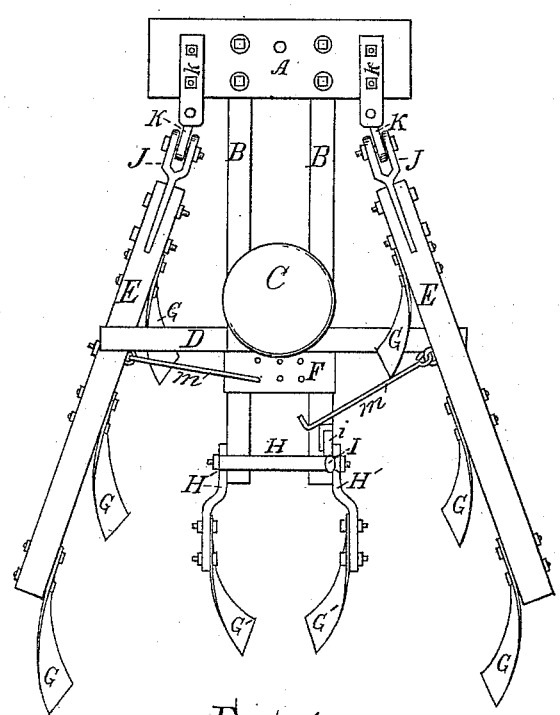
Figure 2:
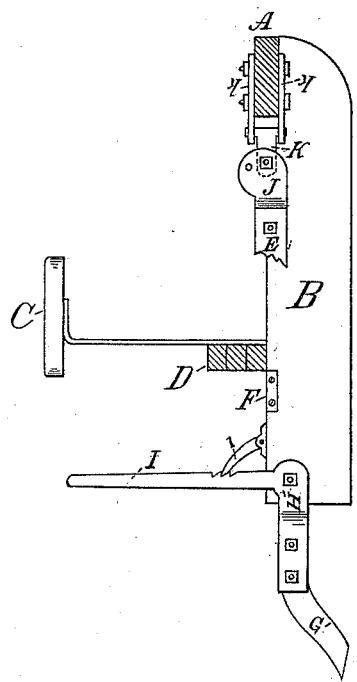

In the accompanying drawings, Figure 1 is a plan view of my improved cultivator. Fig. 2 is a sectional and side view of parts of my invention.

Referring to the drawings by letter, A designates a smoothing-plank of suitable dimensions, intended to smooth down the ridge and at the same time steady the machine. To its forward edges are to be attached the draft-chains, and to the under sides are bolted the protectors or runners B B, which extend back from said smoothing-plank, as shown. In use the protectors are intended to run along the bases of the ridges on opposite sides of the plants. To the rear edge of the smoothing-plank are secured by means of a double coupling, to be hereinafter described, the diverging arms E E. This coupling is composed of the part K, resting in the strips $k$ $k$, as shown, attached to the said smoothing-plank, and forked piece J, bolted or pinned to said part K, as shown. The arms E E are bolted to the part J J. The part K allows a horizontal movement and the part J a vertical movement to the arms E E. The part J is provided with more than one pin or bolt hole to allow the arms E E to be raised or lowered, as desired. At suitable distances apart to said arms are secured the scrapers or shovels G G, which run along the sides of the ridges. The shovels when in use are held in the ground by the assistance of the cross-piece D D, which is secured to the runners.

When the cultivator is not in use, the arms are raised up and rest on the cross-piece D. Upon the top of a standard projecting upward from the cross-piece D rests the seat C for the driver.

For the purpose of adjusting the distance at which the shovels are to cut from the plants the arms E E are provided with adjusting-rods $m$ $m$, having bent ends, which are projected into holes provided in an adjusting-plate F, attached to the top of the runners B B. Each shovel shears in a different place, the shovel nearest the runners shearing the weed-rows and throwing it against the runners. The shovels are attached to the arms E by two bolts, the front bolt passing through a slot in the shovel so as to permit the shovel to turn up or over, and thus regulate the cut. The under part of the cross-piece D is notched so as to allow the depth of the cut to be regulated by moving the arms toward or from the runners. To the rear ends of the runners is attached the arch H, having shoulders H', projecting backward. To these shoulders are attached the shovels G'. The shovels G' are raised or lowered by means of the lever I, attached to the arch H. When lowered, the shovels G' are held in place by means of the lock $i$ applied to the lever I.

The shovels of my cultivator are given a semicircular twist, so as to throw a steady stream of fine dust toward the runners.

In operation the cultivator is drawn along the ground, the draft-animals walking on the ridges and the smoothing-plank passing along the top of the same. The protectors or runners pass along opposite sides of the planks and prevent the dirt from being thrown or turned in too great quantities.

Having thus described my invention, I claim as new and desire to secure by Letters Patent—

1. The combination, in a cultivator, of the smoothing-plank A, runners B B, arms E E, attached to the plank A by means of the double coupling composed of parts K and J, knives G, cross-piece D, adjusting-plate F, and seat C, all substantially as described.

2. The combination, in a cultivator, of the smoothing-plank A, runners B B, arms E E, attached to the smoothing-plank by means of the double coupling composed of the parts K and J, shovels G, cross-piece D, adjusting-plate F, adjusting-rods $m$, seat C, shovels G' G', attached to the runners B B by means of the arch H and shoulder H' H', and raised or lowered by means of the lever I, all substantially as described.

In testimony whereof I affix my signature in presence of two witnesses.

WILLIAM AARON KERSCHNER.

Witnesses:
C. N. CRANDALL,
H. S. BELL.